(No Model.) 2 Sheets—Sheet 1.

J. L. HALYBURTON.
METALLIC ROD PACKING.

No. 509,895. Patented Dec. 5, 1893.

WITNESSES:
H. S. Griffin
Clement Cression

INVENTOR
John L. Halyburton
BY
John Jolley Jr.
his ATTORNEY.

(No Model.)  2 Sheets—Sheet 2.

J. L. HALYBURTON.
METALLIC ROD PACKING.

No. 509,895.  Patented Dec. 5, 1893.

Witnesses:  John L. Halyburton Inventor:
by John Jolley Jr.
His Atty.

UNITED STATES PATENT OFFICE.

JOHN L. HALYBURTON, OF PHILADELPHIA, PENNSYLVANIA, ASSIGNOR, BY MESNE ASSIGNMENTS, TO JEHU WOOD, JR., OF HADDONFIELD, NEW JERSEY.

METALLIC ROD-PACKING.

SPECIFICATION forming part of Letters Patent No. 509,895, dated December 5, 1893.

Application filed July 6, 1893. Serial No. 479,717. (No model.)

*To all whom it may concern:*

Be it known that I, JOHN L. HALYBURTON, a citizen of the United States, residing in the city and county of Philadelphia, in the State of Pennsylvania, have invented certain new and useful Improvements in Metallic Rod-Packing, of which the following is a specification, reference being had to the accompanying drawings, which illustrate my invention and form a part hereof, and in which—

Figure 1:
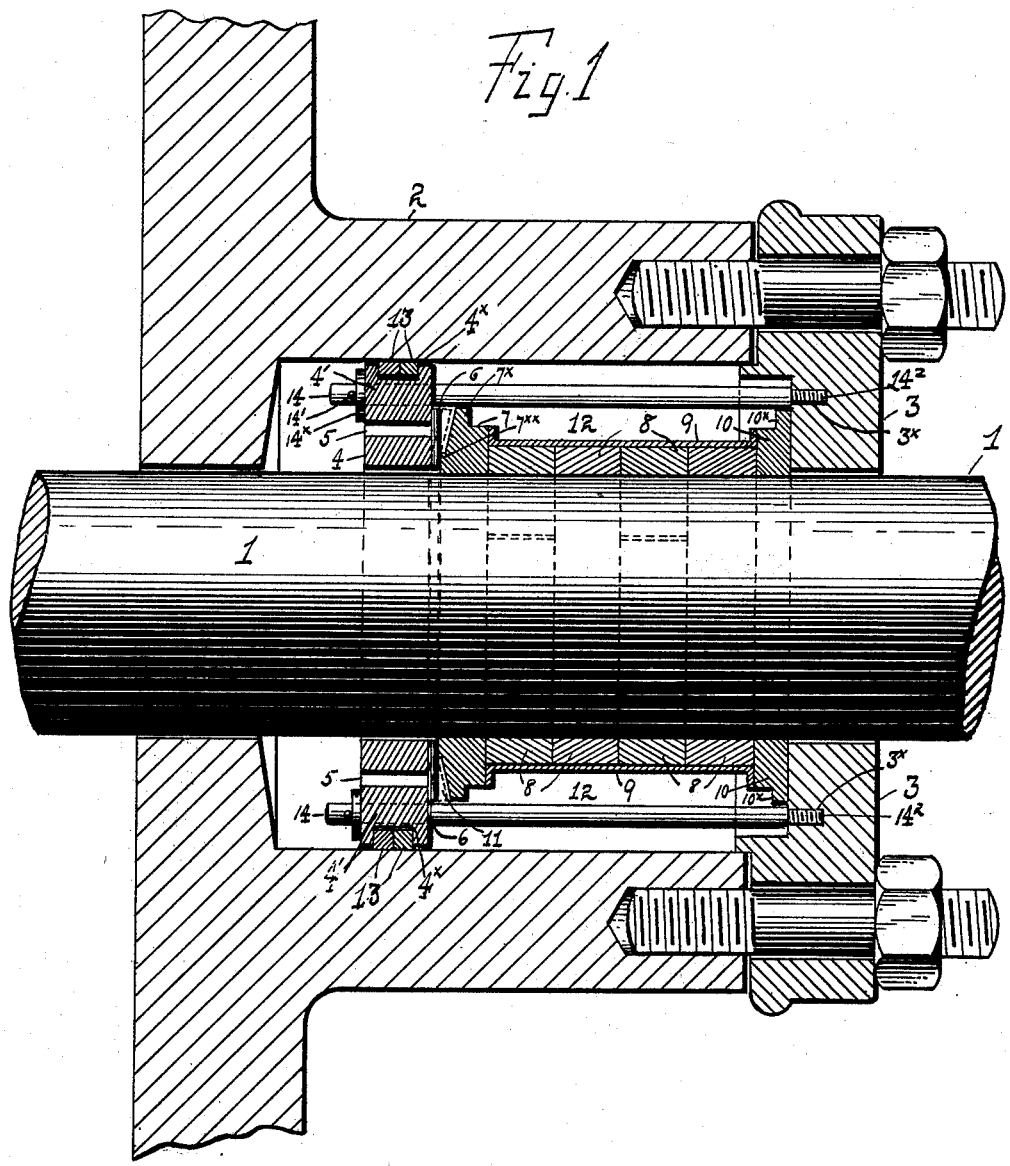
Figure 2:
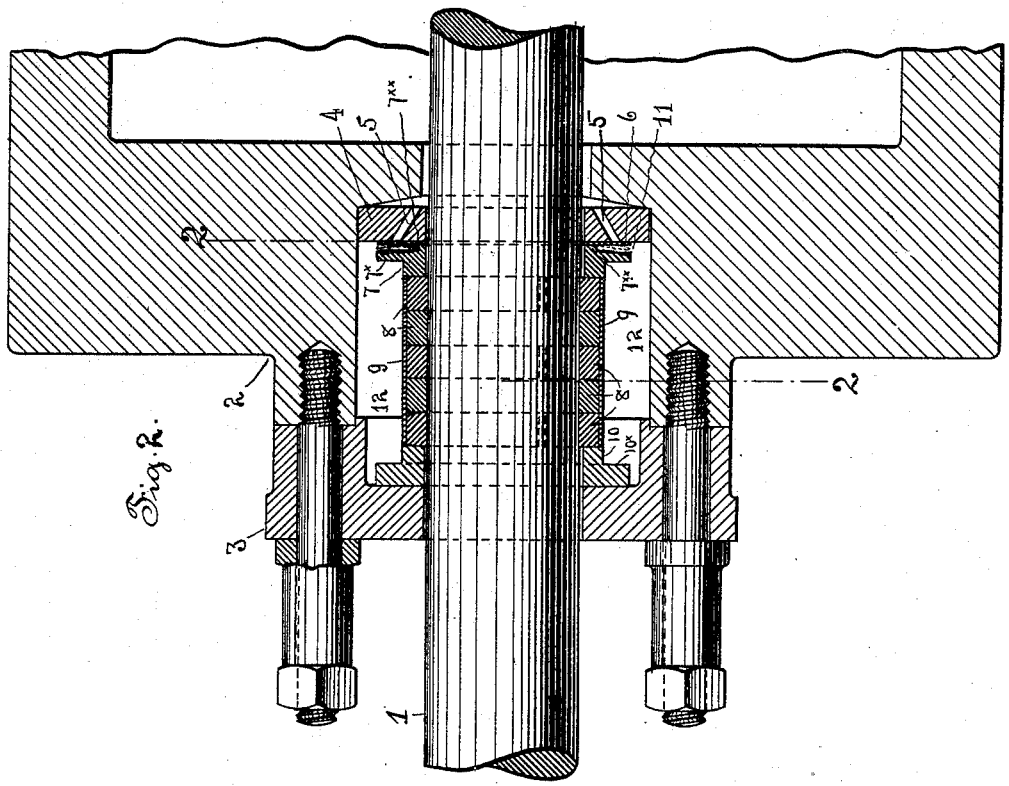
Figure 3:
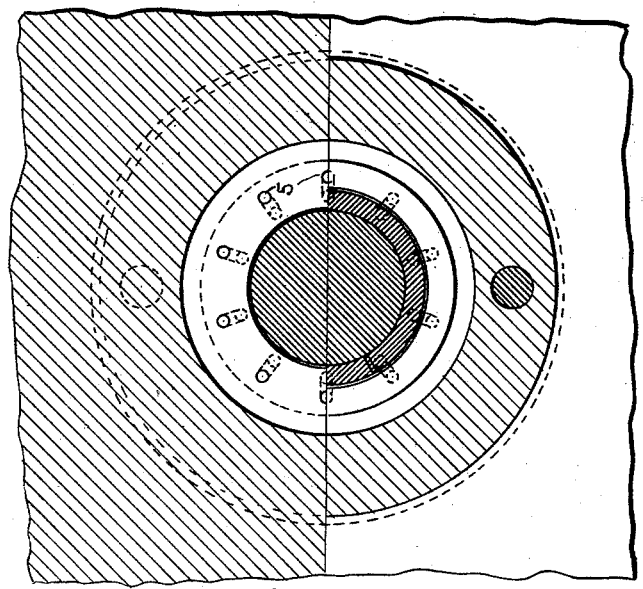

Figure 1 is a transverse sectional view of so much of a steam engine as is necessary to illustrate my invention, and represents in place in the stuffing box thereof a packing ring embodying my invention. Fig. 2 is a transverse sectional view of so much of a steam engine as is necessary to illustrate my invention, and represents in place in the stuffing box thereof a modified form of packing ring embodying my invention, and Fig. 3 is a vertical sectional view of my packing ring taken on the lines 2—2 of Fig. 2.

It is the object of my invention to provide a metallic piston-rod and valve-stem packing for steam engines, pumps, valves and the like, that will be self-adjusting, effective and durable in operation, cheap and simple in construction, require no lubrication, reduce friction to a minimum, and not wear the rod or stem to which it is applied, and to the end sought,—reference being had to the accompanying drawings in which the several parts are indicated by numerals,—consists of a metallic ring or seat 4 placed in the stuffing box 2 of an engine, pump, valve or the like, and provided with an annular series of pressure admitting ports or passages 5 in communication with the cylinder or chamber from whence the pressure is derived, and a flexible disk or diaphragm 6 of metal or other suitable material placed next said seat 4 within the stuffing box 2 and covering said series of ports or passages 5 in the manner shown;—a second metallic ring 7 provided with an annular shoulder $7^\times$ having an annular off-set or projection $7^{\times\times}$ in contact with said flexible disk or diaphragm 6 whereby an annular space 11 is formed between a portion of said flexible disk or diaphragm 6 and the shoulder $7^\times$ of said ring 7; and whereby said flexible disk or diaphragm 6 under pressure communicated through the series of ports or passages 5 in the ring or seat 4 may be forced away from said ports or passages as shown in dotted lines in Figs. 1 and 2 and admit the initial pressure to the area 12 about the packing ring, and be forced or returned to its place against the seat to cover the said series of ports or passages therein by the ratio of pressure contained in said combined areas 11 and 12 acting upon the exposed surface or area of said flexible disk or diaphragm on its far side to the series of ports 5 exceeding the ratio of pressure of the combined areas of the ports 5 through which the initial pressure supply is admitted to the near side of said flexible disk or diaphragm for a purpose hereinafter set forth.

It further consists of an additional split packing ring or series of split rings 8 arranged end to end and to break joint, surrounded or incased within another or bull-ring 9 provided with a split as to its longitudinal axis (said split not being shown) arranged also to break joint with the incased split packing ring or rings and employed to cover the splits in said incased packing rings; a ring 10 provided with a shoulder $10^\times$ and placed at the end of said split rings and abutting against the plate or cover 3 at the outer end of the stuffing box 2, said last mentioned ring being forced against said plate or cover by the pressure admitted to the area 12 about the packing ring as a whole through the ports or passages 5 in the first mentioned ring or seat 4 as described, acting on its shoulder $10^\times$; the admitted applied pressure also acting on the periphery or outer circumference of the split bull or incasing ring 9 and causing the incased split ring or series of incased split rings 8 to bite, close on or grasp the rod or stem 1 working centrally through said packing ring as a whole.

It further consists (see Fig. 1) in preferably, but not essentially, providing the periphery of the metallic ring or seat 4 with a groove or recess $4^\times$ in which are mounted one or more split metallic rings 13 thereby effectually steam or otherwise sealing the periphery of said ring 4 with the stuffing box 2; also in providing said ring 4 with two or more perforations 4' immediately below the recess 4× adapted to receive a corresponding number of bolts or tie rods 14. These rods are of metal preferably screw threaded 14², at one end to engage a screw tapped recess 3× in the inner face of the cover 3 to the stuffing box 2 and of length sufficient to extend to and pass through the perforations 4' in the ring 4 and be there secured with a pin 14' and washer 14×. The office of these tie bolts 14 is to hold the several parts of the packing as a whole in close contact or union, and chiefly against the action of the vacuum created in the stuffing box upon the outer stroke of the piston; the initial pressure upon the inner stroke of the piston acting upon the face of the ring 4 and tending to drive or push it and the several other parts of the packing as a whole toward the opposite end or cover 3 of the box 2; and as will be understood, in either instance, the shouldered ring 10 next the cover 2 is acted upon by the pressure contained within the area 12 about the packing ring and seals that end of the box against the escape of the steam to the atmosphere.

The tie rods 14 and their necessary co-parts or elements may be dispensed with. In such case a sufficient number of split metallic rings are employed to cause the packing as a whole to snugly fit to the interior of the box or bearing to which it is applied. (See Fig. 2.)

I preferably construct the series of split packing rings 8 of white metal and the bull or incasing ring 9 of annealed copper by reason of their non-resilient qualities. The wear of the rings 8 being taken up by the bull ring 9—that is to say: the bull ring 9 when made of annealed copper, by reason of its non-resilience will always hug or follow the rings 8 and receive and transmit applied pressure to the rings 8 to cause them to grip the rod or stem 1. The bull ring 9 abuts at its respective ends against the shouldered rings 7 and 10 respectively, as clearly shown in Figs. 1 and 2 and is thereby retained against displacement.

A packing ring constructed and arranged as described in accordance with my invention effectually seals the cylinder or chamber from which pressure is derived against communication with the atmosphere or anything that may be on the outside of the plate or cover of the stuffing box, for instance, another cylinder or chamber.

The main object of the flexible disk or diaphragm lying against the face of the metallic seat 4 in the stuffing box is to regulate and retain just sufficient of the pressure that is admitted through the series of ports or passages to the areas about the packing ring to act on said split rings described to cause them to bite or grasp the rod or stem, and on the shouldered rings to seal the joint between the end ring and face of plate or cover of the stuffing box, and between the flexible disk and seat 4 in the stuffing box, and between the intermediate split rings and the rod or stem.

The pressure admitted to the area about the packing ring through the series of ports or passages to act upon said rings forming the packing ring proper, bears the same ratio per square inch to the maximum pressure per square inch in the cylinder or chamber as the combined areas of the series of ports or passages in the seat bears to the exposed area of the flexible disk or diaphragm or its side opposite said series of ports or passages, except such pressure as is required to move the flexible disk or diaphragm from its seat at its edge, thus keeping a minimum and uniform pressure of the rings against the rod or stem, and making an effectual seal both to internal and external or atmospheric pressure; and whether a pressure or vacuum exists in the cylinder or chamber it offers an effectual seal to either.

I claim—

1. A metallic packing for steam engines, pumps, &c., consisting of a ring or seat provided with a series of port openings, a flexible disk or diaphragm on one side of said ring or seat adapted to cover said port openings, a second ring provided with a shoulder and an off-set or projection, the latter abutting against said flexible disk or diaphragm forming a space between said flexible disk and shoulder, one or more split rings and a split incasing ring for the latter arranged to break joint, and next said split rings, a ring provided with a shoulder, as described and for the purposes set forth.

2. In combination with a sliding or rotating rod or stem and its fixed box or bearing of the herein described self adjusting metallic packing ring consisting of a ring or seat placed within said box or bearing and provided with a series of ports having a source of pressure supply, a flexible disk or diaphragm next the face of said seat adapted to cover the series of ports therein, a second ring provided with a shoulder and an off-set or projection, the latter abutting against said flexible disk or diaphragm and forming an annular space between said flexible disk and shoulder, a split packing ring next said second ring and a split bull ring surrounding the same and arranged to break joint therewith, and a ring provided with a shoulder next said split rings and abutting against the plate or cover of the fixed box or bearing; the whole constructed, arranged and operating as described and for the purposes set forth.

3. In combination with a sliding or rotating rod or stem and its fixed box or bearing of the herein described self adjusting metallic packing ring consisting of a ring or seat placed within said box or bearing and provided with a series of ports having a source of pressure supply, a flexible disk or diaphragm next the face of said seat adapted to cover the series of ports therein, a second ring provided with a shoulder and an off-set or projection, the latter abutting against said flexible disk or diaphragm and forming an annular space between said flexible disk or diaphragm and shoulder, a series of split packing rings arranged end to end and to break joint with each other, a split bull or incasing ring surrounding said series of rings and arranged to break joint therewith, and next said split rings a ring provided with a shoulder abutting against the plate or cover of the fixed box or bearing, the whole constructed, arranged and operating as described and for the purposes set forth.

4. In combination with a sliding or rotating rod or stem and its fixed box or bearing of the herein described self-adjusting metallic packing ring consisting of a ring or seat placed within said box or bearing and provided with a series of ports having a source of pressure supply, a flexible disk or diaphragm next the face of said seat adapted to cover the series of ports therein, a second ring provided with a shoulder and an off-set or projection, the latter abutting against said flexible disk or diaphragm and forming an annular space between said flexible disk or diaphragm and shoulder, a series of split packing rings arranged end to end and to break joint with each other, a split bull or incasing ring surrounding said series of rings and arranged to break joint therewith, next said split ring a ring provided with a shoulder abutting against the plate or cover of the fixed box or bearing, and means for compactly holding the several parts, the whole constructed, arranged and operating as described and for the purposes set forth.

5. In combination with a sliding or rotating rod or stem and its fixed box or bearing of the herein described self adjusting metallic packing ring consisting of a ring or seat placed within said box or bearing provided as to its periphery with a groove or recess containing one or more split rings and as to its body portion with a series of ports having a source of pressure supply, a flexible disk or diaphragm next said ring or seat opposite the source of pressure supply adapted to cover the series of ports therein, a second ring provided with a shoulder and an off-set or projection the latter abutting against said flexible disk or diaphragm and forming an annular space between said flexible disk and shoulder, a series of split packing rings arranged end to end and to break joint with each other, a split bull or incasing ring surrounding said series of rings and arranged to break joint therewith, a ring at the end of said split rings, provided with a shoulder and abutting against the plate or cover of the fixed box or bearing, and means for compactly holding the several parts, the whole constructed, arranged and operating as described and for the purposes set forth.

6. In a metallic packing of the character herein described in combination with a ring or seat provided with a series of pressure admitting ports, a pressure regulating flexible disk or diaphragm next the opposite side of the pressure admitting ports, from the source of pressure supply, said disk or diaphragm adapted to cover said ports and under sufficient initial pressure admit such initial pressure to the area about the packing ring and under sufficient pressure contained in said area close said ports, whereby sufficient pressure only is retained within said area, to cause the packing ring to uniformly bite or grip its rod or stem and to close or seal all joints as described.

In testimony whereof I have hereunto signed my name this 5th day of October, A. D. 1892.

JOHN L. HALYBURTON.

In presence of—
JOHN JOLLEY, Jr.,
JNO. F. REARDON.